United States Patent [19]

Heusler et al.

[11] 3,716,465
[45] Feb. 13, 1973

[54] PROCESS FOR THE MANUFACTURE OF THIAZACYCLIC HYDROXY COMPOUNDS

[75] Inventors: Karl Heusler, Basel, Switzerland; Robert Burns Woodward, Cambridge, Mass.

[73] Assignee: Ciba-Geigy Corporation, Ardsley, N.Y.

[22] Filed: Nov. 23, 1970

[21] Appl. No.: 92,203

[30] Foreign Application Priority Data

Nov. 27, 1969 Switzerland..........................17669/69

[52] U.S. Cl. ............................204/158 R, 260/243 C
[51] Int. Cl. ................................................B01j 1/10
[58] Field of Search ................204/158 R; 260/243 C

[56] References Cited

UNITED STATES PATENTS 3,600,287  8/1971  Massie..............................204/158 R Primary Examiner—John H. Mack
Assistant Examiner—W. I. Solomon
Attorney—Harry Goldsmith, Joseph G. Kolodny and Mario A. Monaco

[57] ABSTRACT

The invention concerns a process for the manufacture of 6-acylamino-3-hydroxy-2,2-dimethyl-penam compounds, useful as intermediates, which are obtained by irradiation of 6-acylamino-3-arylmethoxycarbonylamino-2,2-dimethylpenam compounds with simultaneous or subsequent treatment with water. Also included are the starting materials used in the above procedure.

11 Claims, No Drawings

PROCESS FOR THE MANUFACTURE OF THIAZACYCLIC HYDROXY COMPOUNDS

The Patent Application Ser. No. 842,028, filed July 15, 1969 by Karl Heusler et al, describes a process for the manufacture of thiazacyclic hydroxy compounds, especially of 3,3-dimethyl-2-hydroxy-6-N-Ac-amino-4-thia-1-azabicyclo[3,2,0]heptan-7-ones (configuration of 6-amino-penicillanic acid) of the formula

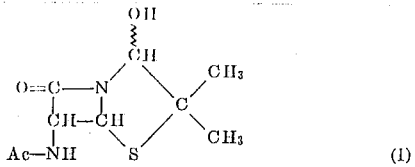

wherein Ac represents the acyl residue of an organic acid, as well as of O-esters of such compounds; this process consists of splitting in a compound of the formula

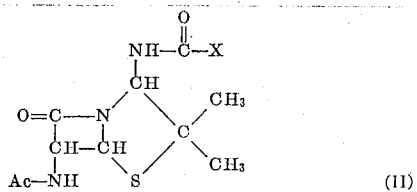

(configuration of 6-amino-penicillanic acid), wherein X represents a substituted hydroxyl or mercapto group which forms together with the carbonyl group an esterified carboxyl grouping capable of being split under neutral or weakly acid conditions, the group of the formula —C(=O)—X under neutral or weakly acid conditions in the presence of water. If desired, the free hydroxyl group in 2-position of a resulting compound may be acylated and/or in a resulting compound with an acylamino grouping possessing protected functional groups such groups may be liberated and/or, if desired, a resulting isomer mixture may be resolved into the individual isomers.

As a preferred group X, the residue of formula —O—$R_o^a$, wherein $R_o^a$ denotes a 2-halogeno-lower alkyl residue, is mentioned; such a residue can contain one, two or more halogen, e.g. chlorine, bromine or iodine atoms, with 2-chloro- and 2-bromo-lower alkyl residues, primarily containing several, preferably three, chlorine or bromine atoms, whilst a 2-iodo-lower alkyl residue can also exhibit only one iodine atom. The residue $R_o^a$ in particular represents a 2-polychloro-lower alkyl residue, such as a 2-polychloroethyl residue, primarily the 2,2,2-trichloroethyl residue, as well as the 2,2,2-trichloro-1-methyl-ethyl residue, but can also, for example, denote a 2-polybromo-lower alkyl residue, such as a 2,2,2-tribromoethyl residue, or a 2-iodo-lower alkyl residue, for example, the 2-iodo-ethyl residue.

According to the process of the parent patent application, the preferred group —C(=O)—X of the formula —C(=O)—O—$R_o^a$ is split by treatment with a chemical reducing agent in the presence of water.

It has now been found that the compounds of formula I can also be obtained without the use of chemical reducing agents, when compounds of the formula II, in which X represents the residue of formula —O—$R_o^b$, wherein $R_o^b$ denotes an arylmethyl group, in which aryl stands for an optionally substituted aromatic hydrocarbon residue, are irradiated with light and simultaneously or subsequently treated with water and, if desired, in a resulting compound the free hydroxyl group in 2-position is acylated and/or, if desired, in a resulting compound with an acylamino grouping having protected functional groups, such groups are liberated, and/or, if desired, a resulting isomer mixture is resolved into the individual isomers.

In an arylmethyl group $R_o^b$ the aryl residue represents a bicyclic or polycyclic, but especially a monocyclic, optionally substituted aromatic hydrocarbon residue, for example a preferably substituted phenyl group as well as naphthyl group. Substituents of such groups are, for example, optionally substituted hydrocarbon residues, such as lower alkyl, phenyl or phenyl-lower alkyl residues, or functional groups, such as free or functionally modified carboxyl groups, for example, carboxyl, lower alkoxy-carbonyl, carbamoyl or cyano groups, optionally substituted amino groups, such as di-lower alkylamino or lower alkanoylamino groups, especially optionally functionally modified, such as esterified, hydroxyl or mercapto groups, for example, halogen atoms, primarily etherified hydroxyl or mercapto groups, such as lower alkoxy groups, for example, methoxy, ethoxy, n-propyloxy, isopropyloxy, n-butyloxy or tert.-butyloxy groups (which in the case of a phenyl residue are preferably located in the 3-, 4- and/or 5-position), and/or above all nitro groups (preferably located in the 2-position in the case of a phenyl residue).

The methyl portion of an arylmethyl residue $R_o^b$ can optionally exhibit an organic residue, for example, an optionally substituted aliphatic hydrocarbon residue, such as a lower alkyl, for example, methyl, ethyl, n-propyl, isopropyl, n-butyl or tert.-butyl group, or an optionally substituted cycloaliphatic, aromatic or araliphatic hydrocarbon residue, such as an optionally substituted cycloalkyl, for example, cyclohexyl group, or a further aryl, for example, phenyl group, as well as an optionally substituted phenyl-lower alkyl, for example, benzyl group.

A residue $R_o^b$ is preferably an optionally substituted α-phenyl-lower alkyl residue or benzhydryl residue, such as a benzyl residue which is optionally substituted by lower alkoxy, such as methoxy groups, preferably in the 3-, 4- and/or 5-position, and/or nitro groups, preferably in the 2-position, as well as a corresponding 1-phenylethyl residue or benzhydryl residue, especially 3- or 4-methoxy-benzyl, 3,5-dimethoxy-benzyl, 2-nitrobenzyl or 4,5-dimethoxy-2-nitro-benzyl residue.

The irradiation (photolytic decomposition) of the starting material is preferably carried out with ultraviolet light. Herein light of longer or shorter wavelengths is used depending on the nature of the substituent $R_o^b$. Thus, groups of the formula —C(=O)—O—$R_o^b$, in which $R_o^b$ represents an arylmethyl, especially benzyl, residue which is substituted by a nitro group in the 2-position of the aryl residue and optionally exhibits further substituents, such as lower alkoxy, for example, methoxy groups, in the aryl residue, is split by irradiation with ultraviolet light having a wavelength range of above 290 mμ, whilst those in which $R_o^b$ represents an arylmethyl residue, for example, benzyl residue, which is optionally substituted in the 3-, 4- and/or 5-position, for example, by lower alkoxy and/or nitro groups, are split by irradiation with ultraviolet light with a wavelength range of below 290 mµ. In the former case, the process is carried out with a high pressure mercury vapor lamp, with Pyrex glass preferably being used as the filter, for example, at a main wavelength range of about 315 mµ, and in the latter case with a low pressure mercury vapor lamp, for example, at a main wavelength range of about 254 mµ.

The irradiation reaction is carried out in the presence of a suitable polar or non-polar organic solvent or of a mixture; solvents are, for example, optionally halogenated hydrocarbons, such as optionally chlorinated lower alkanes, for example, methylene chloride, or optionally chlorinated benzenes, for example benzene, and also alcohols, such as lower alkanones, for example, acetone. The process is preferably carried out at room temperature or, if necessary, with cooling, usually in an inert gas, for example, a nitrogen atmosphere.

The reaction is preferably carried out in the presence of water, with at least molar amounts, relative to the starting material, and usually an excess of water being used. The irradiation product can however be subsequently treated with water, for example, by working up the resulting product in the presence of water.

If desired, the hydroxyl group in the 2-position in a compound obtainable according to the process can be acylated in a manner which is in itself known. The usual acylating agents, such as acids or their reactive derivatives are used for this purpose, the former, for example, in the presence of a suitable condensation agent, such as a carbodiimide, e.g. dicyclohexylcarbodiimide, and the latter, if necessary, in the presence of a basic agent, such as an organic tertiary base, e.g. triethylamine or pyridine. Reactive derivatives of acids are anhydrides, including inner anhydrides, such as ketenes or isothiocyanates, or mixed anhydrides which can in particular be manufactured with halogenoformic acid esters, for example, chloroformic acid ethyl ester, and also halides, primarily chlorides, or reactive esters, such as esters of acids with alcohols containing electron-attracting groupings or with phenols, as well as with N-hydroxy compounds, for example, cyanomethanol, p-nitrophenol or N-hydroxy-succinimide. The acylation reaction can be carried out in the presence or absence of solvents or solvent mixtures, if necessary with cooling or warming, in a closed vessel under pressure and/or in an inert gas, for example, a nitrogen atmosphere.

In an acyl group Ac of a compound obtainable according to the process, protected functional groups can be liberated in the usual manner, for example, by hydrolysis, reduction or treatment with an acid.

Mixtures of isomers obtainable according to the above process can be resolved into the individual isomers according to methods which are in themselves known, for example, by fractional crystallization, adsorption chromatography (column or thin layer chromatography) or other suitable separation processes. Resulting racemates with salt-forming groups, into which suitable substituents can temporarily be introduced in the usual manner with a view to the resolution of the racemate, can be separated into the antipodes as usual, for example, by forming a mixture of diastereoisomeric salts with optically active salt-forming agents, separating the mixture into the diastereoisomeric salts and converting the separated salts into the free compounds, or by fractional crystallization from optically active solvents.

The process according to the invention also comprises those embodiments according to which compounds formed as intermediate products are used as starting materials and the remaining process stages are carried out with these or the process is interrupted at any stage; furthermore, starting materials can be used in the form of derivatives, for example, of salts, or can be formed during the reaction.

The invention also comprises new intermediate products, as well as process for their manufacture.

Preferably, such starting materials are used and the reaction conditions are so chosen that the compounds mentioned as being particularly preferred are obtained. These can be in the form of isomer mixtures or of pure isomers.

Preferred starting materials and products of the formulas II and I, respectively, are those, in which a group Ac primarily represents the acyl residue of an organic carboxylic acid, especially the acyl residue of an optionally substituted aliphatic, cycloaliphatic, cycloaliphatic-aliphatic, aromatic, araliphatic, heterocyclic or heterocyclic-aliphatic carboxylic acid, as well as the acyl residue of a carbonic acid semi-derivative.

The aliphatic residue of an aliphatic carboxylic acid, this term also comprising formic acid, is an optionally substituted aliphatic hydrocarbon residue, such as an alkyl, alkenyl or alkinyl residue, especially a lower alkyl or lower alkenyl residue and also a lower alkinyl residue, which can, for example, contain up to seven, preferably up to four, carbon atoms. Such residues can optionally be monosubstituted, disubstituted or polysubstituted by functional groups, for example, by free, etherified or esterified hydroxyl or mercapto groups, such as lower alkoxy, lower alkenyloxy, lower alkylenedioxy, optionally substituted phenyloxy or phenyl-lower alkoxy, lower alkylmercapto or optionally substituted phenylmercapto or phenyl-lower alkylmercapto, lower alkoxycarbonyloxy or lower alkanoyloxy groups, as well as halogen atoms, and also be nitro groups, optionally substituted amino groups, acyl groups, such as lower alkanoyl groups, or optionally functionally modified carboxyl groups, such as lower alkoxy-carbonyl groups, optionally N-substituted carbamoyl groups or cyano groups.

A cycloaliphatic or cycloaliphatic-aliphatic residue of an appropriate carboxylic acid is an optionally substituted cycloaliphatic or cycloaliphatic-aliphatic hydrocarbon residue, for example, a monocyclic, bicyclic or polycyclic cycloalkyl or cycloalkenyl group, or cycloalkyl- or cycloalkenyl-lower alkyl or -lower alkenyl group, wherein a cycloalkyl residue, for example, contains up to 12, such as 3–8, preferably 3–6, ring carbon atoms, whilst a cycloalkenyl residue, for example, possesses up to 12, such as 3–8, especially 5–8, preferably five of six, ring carbon atoms, as well as one to two double bonds, and the aliphatic portion of a cycloaliphatic-aliphatic residue can, for example, contain up to seven, preferably up to four, carbon atoms. The above cycloaliphatic or cycloaliphatic-aliphatic residues can, if desired, be monosubstituted, disubstituted or polysubstituted, for example, by optionally substituted aliphatic hydrocarbon residues, such as those mentioned above, optionally substituted lower alkyl groups or, for example, like the abovementioned aliphatic hydrocarbon residues, by functional groups.

The aromatic residue of an appropriate carboxylic acid is an optionally substituted aromatic hydrocarbon residue, for example, a monocyclic, bicyclic or polycyclic aromatic hydrocarbon residue, especially a phenyl residue, as well as a biphenylyl or naphthyl residue, which can optionally be monosubstituted, disubstituted or polysubstituted, for example, like the abovementioned aliphatic and cycloaliphatic hydrocarbon residues.

The araliphatic residue in an araliphatic carboxylic acid is, for example, an optionally substituted araliphatic hydrocarbon residue, such as an optionally substituted aliphatic hydrocarbon residue containing up to three optionally substituted monocyclic, bicyclic or polycyclic aromatic hydrocarbon residues, and primarily represents a phenyl-lower alkyl or phenyl-lower alkenyl, as well as phenyl-lower alkinyl residue, such residues containing, for example 1–3 phenyl groups, which can optionally be monosubstituted, disubstituted or polysubstituted in the aromatic and/or aliphatic portion, for example, like the abovementioned aliphatic and cycloaliphatic residues.

Heterocyclic residues in heterocyclic or heterocyclic-aliphatic carboxylic acids are especially monocyclic, as well as bicyclic or polycyclic, azacyclic, thiacyclic, oxacyclic, thiazacyclic, oxazacyclic, diazacyclic, triazacyclic or tetrazacyclic residues, preferably of aromatic character which can optionally be monosubstituted, disubstituted or polysubstituted, for example, like the abovementioned cycloaliphatic residues. The aliphatic portion in heterocyclic-aliphatic residues can, for example, have the significance given for the corresponding cycloaliphatic-aliphatic or araliphatic residues.

The acyl residue of a carbonic acid semi-derivative is preferably the acyl residue of a carbonic acid half-ester, wherein the esterifying organic residue represents an optionally substituted aliphatic, cycloaliphatic, aromatic or araliphatic hydrocarbon residue or a heterocyclic-aliphatic residue, primarily the acyl residue of a lower alkyl half-ester of carbonic acid which is optionally substituted, preferably in the α- or β-position (that is to say a lower alkoxy-carbonyl residue which is optionally substituted in the lower alkyl portion, preferably in the α- or β-position), as well as a lower alkenyl, cycloalkyl, phenyl or phenyl-lower alkyl half-ester of carbonic acid which is optionally substituted in the lower alkenyl, cycloalkyl, phenyl or phenyl-lower alkyl portion, respectively, (that is to say a lower alkenyloxy-carbonyl, cycloalkoxy-carbonyl, phenyloxy-carbonyl or phenyl-lower alkoxy-carbonyl residue, which is optionally substituted in the lower alkenyl, cycloalkyl, phenyl or phenyl-lower alkyl portion, respectively). Acyl residues of a carbonic acid half-ester are furthermore appropriate residues of lower alkyl half-esters of carbonic acid, in which the lower alkyl portion contains a heterocyclic group of aromatic character, for example, one of the abovementioned heterocyclic groups of aromatic character, whereby both the lower alkyl residue and also the heterocyclic group may optionally be substituted. Such acyl residues are lower alkoxy-carbonyl groups optionally substituted in the lower alkyl portion, which contain an optionally substituted heterocyclic group of aromatic character in the lower alkyl residue.

A lower alkyl residue is, for example, a methyl, ethyl, n-propyl, isopropyl, n-butyl, isobutyl, sec.-butyl or tert.-butyl group, as well as a n-pentyl, isopentyl, n-hexyl, isohexyl or n-heptyl group, whilst a lower alkenyl residue can, for example, be a vinyl, allyl, isopropenyl, 2- or 3-methallyl or 3-butenyl group, and a lower alkinyl residue can, for example, be a propargyl or 2-butinyl group.

A cycloalkyl group is, for example, a cyclopropyl, cyclobutyl, cyclopentyl, cyclohexyl or cycloheptyl, as well as adamantyl group, and a cycloalkenyl group is, for example, a 2- or 3-cyclopentenyl, 1-, 2- or 3-cyclohexenyl or 3-cycloheptenyl group, as well as a 2-cyclopropenyl group. A cycloalkyl-lower alkyl or -lower alkenyl residue is, for example, a cyclopropyl-, cyclopentyl-, cyclohexyl- or cycloheptylmethyl, -1,1- or -1,2-ethyl, -1,1-, -1,2- or -1,3-propyl, -vinyl or -allyl group, whilst a cycloalkenyl-lower alkyl or -lower alkenyl group, for example, represents a 1-, 2-or 3-cyclopentenyl-, 1-, 2- or 3-cyclohexenyl- or 1-, 2- or 3-cycloheptenyl-methyl, -1,1- or -1,2-ethyl, -1,1-, -1,2- or -1,3-propyl, -vinyl or -allyl group.

A naphthyl residue is a 1- or 2-naphthyl residue, whilst a biphenylyl group, for example, represents a 4-biphenylyl residue.

A phenyl-lower alkyl or phenyl-lower alkenyl residue is, for example, a benzyl, 1- or 2-phenylethyl, 1-, 2- or 3-phenylpropyl, diphenylmethyl, trityl, 1- or 2-naphthylmethyl, styryl or cinnamyl residue.

Heterocyclic residues are, for example, monocyclic, monoazacyclic, monothiacyclic or monooxacyclic residues of aromatic character, such as pyridyl, for example, 2-pyridyl, 3-pyridyl or 4-pyridyl residues, furthermore pyridinium residues, thienyl, for example, 2-thienyl residues, or furyl, for example, 2-furyl residues, or bicyclic monoazacyclic residues of aromatic character, such as quinolinyl, for example, 2-quinolinyl or 4-quinolinyl residues, or isoquinolinyl, for example, 1-isoquinolinyl residues, or monocyclic, diazacyclic, triazacyclic, tetrazacyclic, thiazacyclic or oxazacyclic residues of aromatic character, such as pyrimidinyl, triazolyl, tetrazolyl, oxazolyl, isoxazolyl, thiazolyl or isothiazolyl residues. Heterocyclic-aliphatic residues are heterocyclic lower alkyl or lower alkenyl residues, which in particular contain the abovementioned residues.

By etherified hydroxyl groups there are primarily to be understood lower alkoxy, for example, methoxy, ethoxy, n-propyloxy, isopropyloxy, n-butyloxy, isobutyloxy, sec.-butyloxy, tert.-butyloxy, n-pentyloxy or tert.-pentyloxy groups, as well as substituted lower alkoxy, such as halogeno-lower alkoxy, especially 2-halogeno-lower alkoxy, for example, 2,2,2-trichloroethoxy or 2-iodoethoxy groups, and also lower alkenyloxy, for example, vinyloxy or allyloxy groups, lower alkylenedioxy, for example, methylenedioxy or ethylenedioxy, as well as isopropylidenedioxy groups, cycloalkoxy, for example, cyclopentyloxy, cyclohexyloxy or adamantyloxy groups, phenyloxy groups, phenyl-lower alkoxy, for example, benzyloxy or 1- or 2-phenylethoxy groups, or lower alkoxy groups which are substituted by monocyclic monoazacyclic, monooxacyclic or monothiacyclic groups of aromatic character, such as pyridyl-lower alkoxy, for example, 2-pyridylmethoxy groups, furyl-lower alkoxy, for example, furfuryloxy groups, or thienyl-lower alkoxy, for example, 2-thenyloxy groups.

As etherified mercapto groups, lower alkylmercapto, for example, methylmercapto or ethylmercapto groups, phenylmercapto groups or phenyl-lower alkylmercapto, for example, benzylmercapto groups, should be mentioned.

Esterified hydroxyl groups are primarily halogen, for example fluorine, chlorine, bromine or iodine atoms, as well as lower alkanoyloxy, for example acetyloxy or propionyloxy groups.

Substituted amino groups are monosubstituted or disubstituted amino groups, in which the substitutents primarily represent optionally substituted monovalent or bivalent aliphatic, cycloaliphatic, cycloaliphatic-aliphatic, aromatic or araliphatic hydrocarbon residues, as well as acyl groups. Such amino groups are especially lower alkylamino or di-lower alkylamino, for example, methylamino, ethylamino, dimethylamino or diethylamino groups, or lower alkyleneamino groups which are optionally interrupted by hetero-atoms, such as oxygen or sulfur atoms or by nitrogen atoms which are optionally substituted, for example, by lower alkyl groups, such as pyrrolidino, piperidino, morpholino, thiomorpholino or 4-methyl-piperazino groups, as well as acylamino, especially lower alkanoylamino, such as acetylamino or propionylamino groups.

A lower alkanoyl residue is, for example, an acetyl or propionyl group.

A lower alkoxy-carbonyl residue is, for example, a methoxycarbonyl, ethoxycarbonyl, n-propyloxycarbonyl, isopropyloxycarbonyl, tert.-butyloxycarbonyl or tert.-pentyloxycarbonyl group.

Optionally N-substituted carbamoyl groups are, for example, N-lower alkyl-carbamoyl or N,N-di-lower alkylcarbamoyl, such as N-methyl-, N-ethyl-, N,N-dimethyl- or N,N-diethyl-carbamoyl groups.

A lower alkenyl-carbonyl residue is, for example, the vinyloxy-carbonyl group, whilst cycloalkoxy-carbonyl and phenyl-lower alkoxy-carbonyl groups, in which the cycloalkyl or phenyl-lower alkyl residue have the abovementioned significance, for example, represent adamantyloxy-carbonyl, benzyloxy-carbonyl or diphenylmethoxy-carbonyl groups, as well as α-4-biphenylyl-α-methyl-ethoxy-carbonyl groups. Lower alkoxy-carbonyl groups, in which the lower alkyl residue, for example, contains a monocyclic monoazacyclic, monooxacyclic or monothiacyclic group are, for example, furyl-lower alkoxy-carbonyl, such as furfuryloxycarbonyl groups, or thienyl-lower alkoxy-carbonyl, for example 2-thenyloxycarbonyl groups.

O-Esters of compounds of formula I are those with organic sulfonic acids, especially aliphatic or aromatic sulfonic acids, in which aliphatic and aromatic residues have the abovementioned significance, such as lower alkanesulfonic acids, for example, methanesulfonic or ethanesulfonic acids, or arylsulfonic acids, for example, benzenesulfonic or toluenesulfonic acids, or with organic carboxylic acids, such as aliphatic, cycloaliphatic, cycloaliphatic-aliphatic, aromatic, araliphatic, heterocyclic or heterocyclic-aliphatic carboxylic acids, which contain the abovementioned organic residues, such as lower alkanecarboxylic acids, which can optionally be substituted, for example, by halogen atoms, such as formic acid, propionic acid, pivalic acid, diethylacetic acid or chloroacetic acid, cycloalkanecarboxylic acids, such as cyclopentane-carboxylic acid or cyclohexane-carboxylic acid, cycloalkyl-lower alkanecarboxylic acids, such as cyclohexylacetic acid, aromatic and araliphatic carboxylic acids which an optionally be substituted in the aromatic ring, for example, by lower alkyl or lower alkoxy groups, halogen atoms, nitro, carboxy, lower alkoxy-carbonyl, carbamoyl or cyano groups, for example, benzoic acid, naphthoic acid, phenylacetic acid, phenylpropionic acid or cinnamic acid, or carboxylic acids containing optionally substituted heterocyclic residues, for example, pyridinecarboxylic, furanecarboxylic or thiophenecarboxylic acids, 2-pyridylacetic acid or 2-thiopheneacetic acid, as well as 3-(2-furyl)-propionic acid, furthermore O-esters with carbonic acid half-derivatives, such as carbonic acid half-esters, e.g. lower alkyl or halogeno-lower alkyl half-esters of carbonic acid.

Particularly valuable compounds are the 2,2-dimethyl-3-hydroxy-6-N-Ac'-amino-penam compounds of the formula

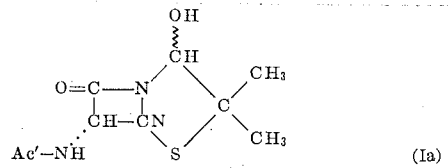

(Ia)

obtainable according to the present invention, wherein Ac' represents an acyl residue occurring in pharmacologically active N-acyl derivatives of 6-amino-penicillanic acid or of 7-amino-cephalosporanic acid, such as for example the residue of the formula y—$(C_mH_{2m})$—C(=O)—, wherein $m$ represents 0, 1 or 2, preferably 1, and a carbon atom of the preferably unbranched alkylene residue of the formula —$(C_mH_{2m})$— can optionally be substituted by an optionally substituted amino group, a free, etherified or esterified hydroxyl or mercapto group or a free or functionally modified carboxyl group, or by an oxo group, for example by one of the abovementioned groups of this nature, and wherein Y represents an aromatic or cycloaliphatic hydrocarbon, such as phenyl or cyclohexyl residue or heterocyclic residue, the latter being preferably of aromatic nature and representing, for example, a pyridyl, pyridinium, thienyl, furyl, imidazolyl, tetrazolyl or isoxazolyl group, said residues being optionally substituted in the nucleus, for example, by the substituents indicated for the above alkylene residue, as well as by nitro or optionally functionally converted sulfo groups, or represents a hydroxyl or mercapto group etherified by an aromatic or cycloaliphatic hydrocarbon residue or a heterocyclic residue, the latter preferably being of aromatic character, whereby these residues are, for example, those mentioned, which may optionally be substituted. Such residues are, for example, a 2,6-dimethoxybenzoyl, tetrahydronaphthoyl, 2-methoxy-naphthoyl, 2-ethoxynaphthoyl, cyclopentylcarbonyl, α-amino-cyclopentylcarbonyl or α-amino-cyclohexylcarbonyl (optionally with substituted amino group, for example, a sulfoamino group optionally in salt form, or an acylated amino group), benzyloxycarbonyl, hexahydrobenzyloxycarbonyl, 2-phenyl-5-methyl-4-isoxazolylcarbonyl, 2-(2,6-dichlorophenyl)-5-methyl-isoxazolylcarbonyl, phenylacetyl, phenyloxyacetyl, phenylthioacetyl, bromophenylthioacetyl, 2-phenyloxypropionyl, α-phenyloxyphenylacetyl, α-methoxyphenylacetyl, α-methoxy-3,4-dichlorophenylacetyl, α-cyano-phenylacetyl, phenylglycyl (optionally with substituted, for example, as mentioned above, amino group), benzylthioacetyl, benzylthiopropionyl, α-carboxy-phenylacetyl (optionally with functionally converted, such as salified or esterified carboxyl group), pyridylacetyl, 4-amino-pyridiniumacetyl, 2-thienylacetyl, 3-thienylacetyl, α-carboxy-2-thienylacetyl or α-carboxy-3-thienylacetyl (optionally with functionally converted carboxyl group, such as mentioned above), α-cyano-2-thienylacetyl, α-amino-2-thienylacetyl or α-amino-3-thienylacetyl (optionally with substituted amino group, e.g. as mentioned above), 2-furylacetyl, 1-imidazolylacetyl, 1-methyl-5-tetrazolylacetyl, 3-methyl-2-imidazolylacetyl or 1,2,4-triazol-3-ylthioacetyl group. An acyl residue also represents a group of the formula $C_nH_{2n+1}-C(=O)-$ or $C_nH_{2n-1}-C(=O)-$, wherein $n$ represents an integer of up to 7, and the chain can be straight or branched and optionally be interrupted by an oxygen or sulfur atom and/or substituted, for example, by halogen atoms, trifluoromethyl, free or functionally modified carboxyl, such as lower alkoxy-carbonyl or cyano groups, free or substituted amino groups, or oxo, azido or nitro groups, for example, a propionyl, butyryl, hexanoyl, octanoyl, acrylyl, crotonyl, 2-butenoyl-, 2-pentenoyl, methoxyacetyl, methylthioacetyl, butylthioacetyl, allylthioacetyl, chloroacetyl, bromoacetyl, 3-chloropropionyl, 3-bromopropionyl, aminoacetyl, 5-amino-5-carboxy-valeryl (optionally with substituted amino group and/or with functionally modified carboxyl group), azidoacetyl, 2-carboxypropionyl, methoxycarbonylacetyl, ethoxycarbonylacetyl, bismethoxycarbonylacetyl, N-phenylcarbamyl-acetyl, cyanoacetyl, α-cyanopropionyl or 2-cyano-3-dimethyl-acrylyl group, or represents a residue of the formula $Z-NH-(C=O)-$, wherein Z denotes an optionally substituted aromatic or aliphatic hydrocarbon residue, especially a lower alkyl residue substituted by lower alkoxy groups and/or halogen atoms, such as the N-2-chloroethylcarbamyl group.

Above all the group Ac' stands for a monocyclic arylacetyl or aryloxyacetyl residue or an optionally substituted lower alkanoyl or lower alkenoyl residue, for example, the phenylacetyl, 4-hydroxyphenylacetyl, phenyloxyacetyl, hexanoyl, heptanoyl, 3-hexenoyl, 5-amino-5-carboxyvaleryl, n-butylthioacetyl or allylthioacetyl residue, or an acyl residue of a half-ester of carbonic acid, which can be easily split off, especially under acid conditions, such as a lower alkoxycarbonyl residue which can easily be split off under acid conditions, for example, a tert.-butoxycarbonyl or tert.-pentyloxycarbonyl residue, a cycloalkoxycarbonyl, for example adamantyloxycarbonyl residue, a phenyl-lower alkoxycarbonyl, for example, diphenylmethoxycarbonyl, as well as α-4-biphenylyl-α-methylethoxycarbonyl residue, or a furyl-lower alkoxycarbonyl, for example, furfuryloxycarbonyl residue.

The compounds obtainable according to the process can be used as starting materials for the manufacture of other compounds, which can be used either as pharmacologically active compounds or as intermediate products; their further use is described in Patent application Ser. No. 842,028 and illustrated by way of working examples.

The starting materials of the formula II used in accordance with the process can, for example, be manufactured by converting an acid compound IIIa having the formula

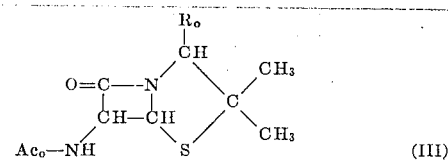

wherein $Ac_o$ represents the acyl residue of an organic carboxylic acid, in which free functional groups, such as hydroxyl, mercapto and especially amino and carboxyl groups are preferably protected, and $R_o$ represents a carboxyl group $-C(=O)-OH$ (compound IIIa) or a salt thereof into the corresponding acid azide compound of the formula III, wherein $R_o$ represents the azidocarbonyl residue $-C(=O)-N_3$ (compound IIIb), converting this, with elimination of nitrogen, to the corresponding isocyanate compound of the formula III, wherein $R_o$ denotes the isocyanato group $-N=C=O$ (compound IIIc), and simultaneously or subsequently treating it with a compound of the formula $HO-R_o^b$ (IV) and, if desired, converting a resulting compound into another of the formula II and/or, if desired, separating a resulting isomer mixture into the individual isomers.

The conversion of an acid compound IIIa or of a suitable salt, especially an ammonium salt, thereof into the corresponding acid azide IIIb can, for example, be carried out by conversion into a mixed anhydride (for example, by treatment with a halogenoformic acid lower alkyl ester, such as chloroformic acid ethyl ester, or with trichloroacetic acid chloride in the presence of a basic agent, such as triethylamine or pyridine) and treatment of such an anhydride with an alkali metal azide, such as sodium azide, or an ammonium azide, for example, benzyltrimethylammonium azide. The acid azide compound IIIb obtainable in this way can be converted into the desired isocyanate compound IIIc in the absence or presence of an alcohol compound of the formula IV under the reaction conditions, for example, on warming, and the isocyanate compound usually does not have to be isolated and can, in the presence of the compound of the formula IV, be directly converted into the desired starting material.

The reaction with an alcohol of the formula IV can optionally be carried out in an inert solvent, for example, in a halogenated hydrocarbon, such as carbon tetrachloride, chloroform or methylene chloride, or in an aromatic solvent, such as benzene, toluene or chlorobenzene, preferably with warming.

In a starting material obtainable according to the process, an acyl residue Ac can be split off in a manner which is in itself known, for example, by treatment with a suitable halogenating agent, such as phosphorus pentachloride, reaction of the imide-chloride with an alcohol, such as a lower alkanol, and splitting of the imino-ether, preferably under acid conditions. The acyl residue of a suitable half-ester of carbonic acid, such as of a lower alkoxy-carbonyl residue which can be split under acid conditions, for example, the tert.-butyloxycarbonyl, as well as tert.-pentyloxycarbonyl, adamantyloxycarbonyl or diphenylmethoxycarbonyl residue, can, for example, be split off by treatment with trifluoroacetic acid. In a resulting compound, protected functional groups in an acyl residue $Ac_o$ can be liberated in the usual manner, for example, by hydrolysis, reduction or treatment with acid.

In a starting material with a free amino group, obtainable in the above manner, such amino group can be acylated according to methods which are in themselves known, such as, for example, like a free hydroxyl group in the manner described above, that is to say by treatment with a free or reactive functionally modified carboxylic acid, for example, with an acid chloride or acid anhydride, optionally in the presence of a condensation agent.

The invention also comprises the new starting materials of the formula II, wherein X denotes the residue of formula $—O—R_{o'}{}^b$ in which $R_o{}^b$ has the abovementioned significance, especially 2,2-dimethyl-3-[$R_o{}^{b'}$—O—C(=O)-amino]-6-N-Ac'-amino-penam starting materials of the formula

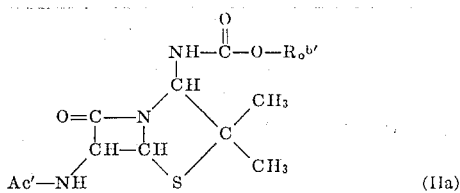

(IIa)

wherein Ac' has the abovementioned significance, and wherein $R_o{}^{b'}$ represents an optionally substituted α-phenyl-lower alkyl residue or benzhydryl residue, such as a benzyl residue, which is optionally substituted by lower alkoxy, such as methoxy groups, preferably in the 3-, 4- and/or 5-position, and/or by nitro groups, preferably in the 2-position, as well as a corresponding 1-phenylethyl residue or benzhydryl residue, especially 3- or 4-methoxy-benzyl, 3,5-dimethoxy-benzyl, 2-nitrobenzyl or 3,4-dimethoxy-6-nitro-benzyl residue.

The invention is described in the following examples; temperatures are given in degrees centigrade.

EXAMPLE 1

A solution of 0.2 g of 3-(N-4,5-dimethoxy-2-nitrobenzyloxycarbonyl-amino)-2,2-dimethyl-6-phenyloxyacetylaminopenam in 45 ml of methylene chloride and 65 ml of methanol is irradiated for 6 hours under a nitrogen atmosphere with a high pressure mercury vapor lamp (in a Pyrex glass apparatus). The reaction mixture is then evaporated to dryness under reduced pressure and chromatographed on a column of 15 g of purified silica gel containing about 5 percent of water. Unchanged starting material is obtained with methylene chloride containing 5 percent of ethyl acetate, and the 3-hydroxy-2,2-dimethyl-6-phenyloxyacetylamino-penam of the formula

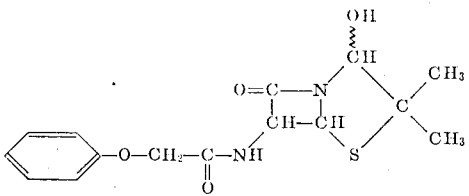

is obtained with a 9:1-mixture of methylene chloride and ethyl acetate; this substance crystallizes spontaneously as the hydrate and after trituration with ether saturated with water melts indistinctly in the range of 62°–85C. The pure product melts at 62°–70°C; thin layer chromatogram (silica gel): Rf = 0.35 (system benzene/ethyl acetate 1:1); infrared absorption spectrum (in methylene chloride): characteristic bands at 2.93μ, 3.09μ, 5.65μ, 5.96μ, 6.29μ, 6.65μ, 6.75μ, 8.57μ, 9.27μ, 10.00μ and 11.95μ.

The starting material can be manufactured as follows:

A solution of 2.625 g of penicillin-V in 30 ml of tetrahydrofurane is mixed with 5.31 ml of a 10 ml solution of 2 ml of triethylamine in tetrahydrofurane, whilst stirring and cooling to −10°C. 3.6 ml of a 10 ml solution of 2 ml of chloroformic acid ethyl ester in tetrahydrofurane are then slowly added at −10°C and after completion of the addition, the mixture is stirred for 90 minutes at −10° to −5°C.

The reaction mixture is treated with a solution of 0.51 g of sodium azide in 5.1 ml of water, stirred for 30 minutes at 0° to −5°C, and diluted with 150 ml of ice water. The mixture is extracted three times with methylene chloride; the organic extracts are washed with water, dried and evaporated at 25°C and under reduced pressure. The amorphous penicillin-V azide is thus obtained as a slightly yellowish oil; infrared absorption spectrum (in methylene chloride): characteristic bands at 3.04μ, 4.70μ, 5.60μ, 5.82μ (shoulder), 5.93μ, 6.26μ, 6.71μ, 8.50μ and 9.40μ.

A mixture of 11 g of crude penicillin-V azide in 250 ml of absolute benzene and 6.75 g of 4,5-dimethoxy-2-nitro-benzyl alcohol (melting point 145°–146°C) is heated at 75°C for 20 minutes; a strong evolution of nitrogen occurs. When the reaction has subsided, the reaction mixture is cooled to room temperature; it is left to stand for one hour and the solvent is then evaporated off under reduced pressure. The residue is placed on a column of 600 g of silica gel and chromatographed. Unchanged 4,5-dimethoxy-2-nitro-benzyl alcohol is eluted with methylene chloride containing 4–5 percent of ethyl acetate, and the desired 3-(4,5-dimethoxy-2-nitro-benzyloxycarbonyl-amino)-2,2-dimethyl-6-phenyloxyacetylamino-penam of the formula

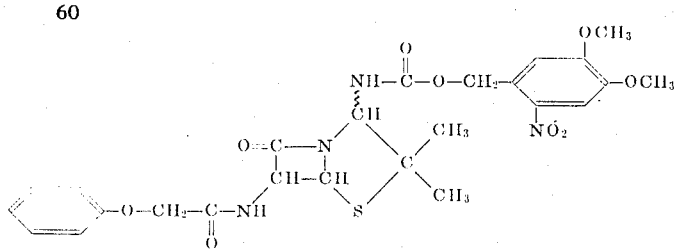

is eluted with methylene chloride, containing 7–15 percent of ethyl acetate. The product crystallizes from a mixture of methylene chloride and cyclohexane in the form of fine light yellow crystals which after two recrystallizations melt at 186°–187°C; $[\alpha]_D^{20} = +75° \pm 1°$ ($c = 1.072$ in chloroform); thin layer chromatography on silica gel: Rf = 0.42 (system toluene/ acetic acid ethyl ester, 1:1), Rf = 0.43 (system toluene/acetone, 3:1) and Rf = 0.76 (system toluene/acetone, 1:1); ultraviolet absorption spectrum (in chloroform): $\lambda_{max}$ 342 m$\mu$ ($\epsilon = 5650$), 300 m$\mu$ ($\epsilon = 4150$), 276 m$\mu$ ($\epsilon = 3400$), 268 m$\mu$ ($\epsilon = 2950$ and 243 m$\mu$ ($\epsilon = 10300$), and $\lambda_{min.}$ 307 m$\mu$ ($\epsilon = 4100$), 279 m$\mu$ ($\epsilon = 3100$), 272 m$\mu$ ($\epsilon = 2800$) and 264 m$\mu$ ($\epsilon = 2350$); infrared absorption spectrum: characteristic bands at 2.92$\mu$, 5.57$\mu$, 5.77$\mu$, 5.89$\mu$, 6.31$\mu$, 6.57–6.65$\mu$, 6.83$\mu$, 7.52$\mu$, 8.22$\mu$, 8.50$\mu$, 9.37$\mu$ and 11.50$\mu$ (in methylene chloride), and at 2.93$\mu$, 5.58$\mu$, 5.80$\mu$, 5.86$\mu$, 6.24$\mu$, 6.33$\mu$, 6.55$\mu$ (shoulder), 6.60$\mu$, 6.69$\mu$, 6.94$\mu$ and 7.37$\mu$ (in mineral oil).

The following compounds can for example be obtained in an analogous manner on choosing the suitable starting materials: 3-hydroxy-2,2-dimethyl-6-phenylacetylamino-penam, colorless oil, infrared absorption spectrum (in methylene chloride): characteristic bands at 2.90$\mu$, 3.05$\mu$, 5.64$\mu$, 5.99$\mu$, 6.70$\mu$ and 9.28$\mu$; and 3-hydroxy-2,2-dimethyl-6-tert.-butyloxycarbonyl-amino-penam, colorless oil, which crystallizes from a mixture of ether and pentane, melting point 106°–110°C (sintering from 100°C onwards); $[\alpha]_D^{20} = \pm 115° \pm 1°$ ($c = 0.858$ in chloroform); thin layer chromatogram (silica gel): Rf$\approx$ 0.53 (system benzene/ethyl acetate 1:1); infrared absorption spectrum (in methylene chloride): characteristic bands at 2.91$\mu$, 3.04$\mu$, 5.64$\mu$, 5.84$\mu$, 6.68$\mu$, 7.33$\mu$ and 8.60$\mu$.

The compounds prepared according to the process of the present invention may be used as follows:

EXAMPLE 2

A solution of 0.14 g of 3-hydroxy-2,2-dimethyl-6-phenyloxyacetylamino-penam in 2 ml of dry benzene is mixed with 1 ml of acetic anhydride and 0.2 ml of pyridine and heated for 2 hours to 50°C. The mixture is then evaporated under reduced pressure and the residue is purified by chromatography on 1 g of acid-washed silica gel. Elution is carried out with 10 ml of benzene and 40 ml of a 19:1-mixture of benzene and ethyl acetate and the pure 3-acetyloxy-2,2-dimethyl-6-phenyloxyacetylamino-penam is thus obtained, m.p. 129°–131°C after crystallization from a mixture of diethyl ether and pentane and recrystallization from diethyl ether; $[\alpha]_D^{20} = +85° \pm 1°$ ($c = 1.135$ in chloroform); infrared absorption spectrum (in methylene chloride): characteristic bands at 3.05$\mu$, 5.61$\mu$, 5.74$\mu$, 5.94$\mu$, 6.28$\mu$, 6.64$\mu$, 6.72$\mu$, 8.32$\mu$ and 9.62$\mu$.

EXAMPLE 3

A solution of 0.3 g of 3-hydroxy-2,2-dimethyl-6-tert.-butyloxycarbonyl-amino penam in 125 ml of anhydrous benzene is mixed with 1 g of vacuum-dried lead tetraacetate and 0.09 ml of pyridine and the mixture is irradiated at about 12°–15° with a high pressure mercury vapor lamp (Hanau; type Q 81; 80 watts) in a water-cooled Pyrex glass jacket, while keeping it agitated by passing a stream of oxygen-free nitrogen through it. A white precipitate of lead diacetate forms; a small quantity of a gum-like black product which very probably contains metallic lead deposits on the Pyrex glass jacket and is scraped off from time to time. After 1 hour the entire quantity of lead tetraacetate has been consumed; the mixture is filtered and the filtrate is washed with a dilute aqueous sodium hydrogen carbonate solution and with water, dried and evaporated under reduced pressure. The crude 1-formyl-2$\alpha$-(2-acetyloxy-2 -propyl-mercapto)-3$\alpha$-tert.-butyloxycarbonyl-amino-azetidin-4-one is obtained as an amorphous product and is further processed without purification; infrared absorption spectrum (in methylene chloride):characteristic bands at 3.04$\mu$, 5.56$\mu$, 5.88$\mu$, 6.70$\mu$, 7.33$\mu$ and 8.70$\mu$.

The crude product resulting from the above process, containing the 1-formyl-2$\alpha$-(2-acetyloxy-2-propylmercapto)-3$\alpha$-tert.-butyloxycarbonyl-amino-azetidin-4-one, is dissolved in 15 ml of toluene and heated for 17 hours in a nitrogen atmosphere at 90°. The mixture is evaporated under reduced pressure and the crude 1-formyl-2$\alpha$-isopropenylmercapto-3$\alpha$-tert.-butyloxycarbonyl-amino-azetidin-4-one is obtained as an amorphous product, which shows the following characteristic bands in the infrared spectrum (in methylene chloride): 3.03$\mu$, 5.55$\mu$, 5.85$\mu$, 6.69$\mu$ and 7.32$\mu$.

The crude 1-formyl-2$\alpha$-isopropenylmercapto-3$\alpha$-tert.-butyloxycarbonyl-amino-azetidin-4-one, obtainable according to the above process, is dissolved in 10 ml of methylene chloride, and the solution is diluted with 10 ml of water and treated with 10 drops of concentrated aqueous ammonia. The reaction mixture is vigorously stirred for 4 hours at room temperature and is then separated into the two layers; the aqueous phase is washed with methylene chloride and the organic solutions are combined, dried and evaporated. The residue is chromatographed on 15 g of acid-washed silica gel, elution being carried out with chloroform. Less polar by-products are first eluted in the forerun, and then the desired 2$\alpha$-isopropenylmercapto-3$\alpha$-tert.-butyloxycarbonyl-amino-azetidin-[ 4-one is obtained, which after crystallization from cold ether melts at 141° and after sublimation (128°–132°/0.001 mm Hg) at 142°–144°; $[\alpha]_D = -26° \pm 1°$ ($c = 0.883$ in chloroform); ultraviolet absorption spectrum (in ethanol):$\lambda_{max}$ = 223 m$\mu$ ($\epsilon = 4840$); infrared absorption spectrum (in methylene chloride): characteristic bands at 3.03$\mu$, 5.63$\mu$, 5.84$\mu$, 6.22$\mu$, 6.67$\mu$, 7.32$\mu$, 7.57$\mu$, 8.64$\mu$, 9.45$\mu$ and 11.65$\mu$.

A solution of 2$\alpha$-isopropenylmercapto-3$\alpha$-tert.-butyloxycarbonyl-amino-azetidin-4-one in 0.5 ml of cold trifluoroacetic acid is kept for 15 minutes at 0°; the solution turns slightly yellowish and is then diluted with a solution of 1 g of crystalline sodium acetate in 2 ml of water. The mixture is extracted three times with 10 ml of methylene chloride at a time; the combined organic extracts are dried and evaporated under reduced pressure; the acetic acid is removed at 0.001 mm Hg. The 4,4-dimethyl-azetidino [3.2.0-d]thiazolidin-2-one is obtained as a colorless oil, which crystallizes on addition of benzene and melts at 115°–117° after recrystallization from benzene; $[\alpha]_D^{20} = +8° \pm 1°$ ($c = 0.845$ in chloroform); thin layer chromatography (silica gel; system: 1:1-mixture of benzene and ethyl acetate): Rf =

0.13; infrared absorption spectrum (in methylene chloride): characteristic bands at 2.95μ, 5.68μ (potassium bromide) and 5.78μ.

A solution of 0.15 g of 4,4-dimethyl-azetidino [3.2-d]thiazolidin-2-one in 10 ml of dry tetrahydrofuran (freshly filtered through a column of aluminum oxide, activity I) is cooled to 0°. Phosgene is passed through the cold solution for 5 minutes and the reaction mixture is stirred for a further 30 minutes and with the exclusion of atmospheric moisture; the precipitate which initially appears re-dissolves. The mixture is then evaporated and the residue is chromatographed on 3 g of acid-washed silica gel. The desired 3-chlorocarbonyl-4,4-dimethyl-azetidino [3.2-d]thiazolidin-2-one is eluted with benzene and with a 9:1-mixture of benzene and ethyl acetate and crystallizes spontaneously. It is recrystallized from a mixture of benzene and hexane and melts at 178°-180° (transformation at 140°-160°); infrared absorption spectrum (in methylene chloride): characteristic bands at 3.04μ, 5.62μ, 5.74μ, 7.48μ, 8.28μ and 11.84μ.

A solution of 0.1 g of 3-chlorocarbonyl-4,4-dimethyl-azetidino[3.2-d]thiazolidin-2-one in 10 ml of tert.-butanol is mixed with 0.2 g of calcium carbonate and heated in a closed vessel for 2½ days at 90° bath temperature while stirring. After cooling the mixture is filtered, the residue is washed with benzene and the filtrate is evaporated under reduced pressure. The residue is taken up in benzene; the organic solution is washed with water, dried and again evaporated. The residue is again dissolved in benzene and chromatographed on 1 g of acid-washed silica gel. The 3-tert.-butyloxycarbonyl-4,4-dimethyl-azetidino[3.2-d]thiazolidin-2-one is eluted with 9:1- and 4:1-mixtures of benzene and ethyl acetate and recrystallized from a mixture of ether and pentane, melting point 117°-120° (analytical preparation: 120.5°); $[\alpha]_D^{20} = -274°$ ($c = 0.522$ in chloroform); thin layer chromatogram (silica gel; system: benzene/ethyl acetate 1:1): Rf = 0.15; infrared absorption spectrum (in methylene chloride): characteristic bands at 2.95μ, 5.62μ, 5.90μ, 7.25μ, 7.35μ, 7.75μ, 8.65μ, 9.36μ, 10.60μ, 11.65μ and 12.30μ.

The resulting 3-tert.-butyloxycarbonyl-4,4-dimethyl-azetidino[3.2-d]thiazolidin-2-one can be used as intermediate in the preparation of 7-amino-cephalosporanic acid and N-acyl derivatives thereof, for example, according to the procedure shown in Austrian Pat. Nos. 263,768 and 264,537.

We claim:

1. A process for the manufacture of compounds of the formula

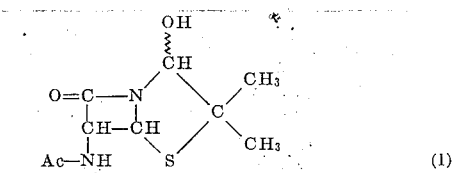

in which Ac represents the acyl residue of an organic acid, wherein a compound of the formula

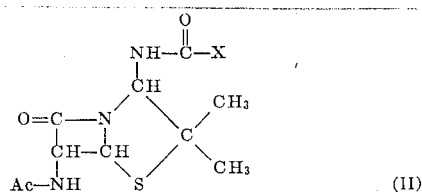

in which X stands for the residue of the formula —O—$R_o^b$, wherein $R_o^b$ denotes an arylmethyl group, in which aryl represents a member selected from the group consisting of an aromatic hydrocarbon residue and a substituted aromatic hydrocarbon residue, is irradiated with light and subsequently treated with water.

2. A process as claimed in claim 1, wherein in the arylmethyl group $R_o^b$ of a starting material of the formula II, the aryl residue represents a member selected from the group consisting of an unsubstituted and substituted mono-, bi- and polycyclic aromatic hydrocarbon residue.

3. A process as claimed in claim 1, wherein an aromatic residue in an arylmethyl residue $R_o^b$ of a starting material of formula II according to claim 1, is a member selected from the group consisting of a phenyl residue and a phenyl residue substituted by a member selected from the group consisting of lower alkoxy and nitro.

4. A process as claimed in claim 1, wherein in a starting material of the formula II according to claim 1, $R_o^b$ represents a member selected from the group consisting of benzyl, 1-phenylethyl and benzhydryl and these residues substituted by a member selected from the group consisting of lower alkoxy and nitro.

5. A process as claimed in claim 1, wherein in a starting material of the formula II according to claim 1, $R_o^b$ represents a member selected from the group consisting of 3-methoxybenzyl, 4-methoxybenzyl, 3,5-dimethoxy-benzyl, 2-nitrobenzyl and 4,5-dimethoxy-2-nitrobenzyl residue.

6. A process as claimed in claim 1, wherein the irradiation is carried out with ultraviolet light.

7. A process as claimed in claim 1, wherein a starting material containing a group —O—$R_o^b$, in which $R_o^b$ represents an arylmethyl residue which is substituted by a nitro group in the 2-position of the aryl residue and optionally contains further substitutents in the aryl portion, is irradiated with ultraviolet light having a wavelength range of above 290mμ.

8. A process as claimed in claim 1, wherein a starting material containing a group —O—$R_o^b$, in which $R_o^b$ represents a member selected from the group consisting of an arylmethyl radical and an arylmethyl radical substituted in at least one of the positions 3, 4 and 5 by a member selected from the group consisting of lower alkoxy and nitro, is irradiated with ultraviolet light having a wavelength range of below 290 mμ.

9. A process as claimed in claim 1, wherein the subsequent treatment with at least 1 mol of water is carried out.

10. A process as claimed in claim 1, wherein the light radiation and water treatment steps are carried out simultaneously.

11. A process as claimed in claim 10, wherein the simultaneous treatment with at least 1 mole of water is carried out.

* * * * *